United States Patent
Amurri et al.

(10) Patent No.: US 12,220,889 B2
(45) Date of Patent: Feb. 11, 2025

(54) PROCESS FOR BUILDING TYRES FOR VEHICLE WHEELS

(71) Applicant: Pirelli Tyre S.p.A., Milan (IT)

(72) Inventors: Cesare Emanuele Amurri, Milan (IT); Christian De Col, Milan (IT); Marco Cantu', Milan (IT); Roger Basilico, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 283 days.

(21) Appl. No.: 17/595,697

(22) PCT Filed: May 26, 2020

(86) PCT No.: PCT/IB2020/054964
§ 371 (c)(1),
(2) Date: Nov. 22, 2021

(87) PCT Pub. No.: WO2020/240407
PCT Pub. Date: Dec. 3, 2020

(65) Prior Publication Data
US 2022/0212430 A1    Jul. 7, 2022

(30) Foreign Application Priority Data
May 30, 2019    (IT) .................... 102019000007590

(51) Int. Cl.
*B29C 48/255*    (2019.01)
*B29C 48/00*    (2019.01)
(Continued)

(52) U.S. Cl.
CPC ...... *B29D 30/3021* (2013.01); *B29C 48/0021* (2019.02); *B29C 48/08* (2019.02);
(Continued)

(58) Field of Classification Search
CPC ................... B29D 30/3021; B29D 30/60
See application file for complete search history.

(56) References Cited

U.S. PATENT DOCUMENTS 5,460,772 A * 10/1995 Ohta ............... B29C 48/21
264/171.27
8,304,056 B2 * 11/2012 Kudo ............. B29D 30/3028
428/156
(Continued)

FOREIGN PATENT DOCUMENTS

CN    101022946 A    8/2007
CN    107428061 A    12/2017
(Continued)

OTHER PUBLICATIONS

Notification of the First Office Action issued by the China National Intellectual Property Administration on May 12, 2023, in corresponding Application No. CN 202080038103.0 (12 pages).
(Continued)

*Primary Examiner* — Xiao S Zhao
*Assistant Examiner* — Nicholas J Chidiac
(74) *Attorney, Agent, or Firm* — Finnegan, Henderson, Farabow, Garrett & Dunner, L.L.P.

(57) ABSTRACT

In a process for building tyres for vehicle wheels, at least one tread band (9) or other elastomeric component of a tyre (2) is made by applying at least one continuous elongated element (14) according to a plurality of turns (C) around a forming drum (15) rotating around a geometric rotation axis (X) thereof. The continuous elongated element (14) is made by the action of extruding a first material through an extrusion nozzle (16), to form an inner core (33) of said continuous elongated element (14) exiting from an outlet opening (18) of the extrusion nozzle (16). During the extrusion, a second material different from the first material is conveyed around the first material, at the extrusion nozzle
(Continued)

(16) and upstream of the outlet opening (18), to form a coating layer (32) which entirely surrounds the inner core (33).

10 Claims, 6 Drawing Sheets

(51) Int. Cl.
| | |
|---|---|
| *B29C 48/08* | (2019.01) |
| *B29C 48/21* | (2019.01) |
| *B29C 48/305* | (2019.01) |
| *B29C 48/49* | (2019.01) |
| *B29C 48/92* | (2019.01) |
| *B29D 30/30* | (2006.01) |
| *B29D 30/60* | (2006.01) |
| *B29D 30/62* | (2006.01) |
| *B29K 105/00* | (2006.01) |
| *B29L 30/00* | (2006.01) |

(52) U.S. Cl.
CPC .......... *B29C 48/21* (2019.02); *B29C 48/2552* (2019.02); *B29C 48/307* (2019.02); *B29C 48/49* (2019.02); *B29C 48/92* (2019.02); *B29D 30/60* (2013.01); *B29D 30/62* (2013.01); *B29C 2948/926* (2019.02); *B29C 2948/92647* (2019.02); *B29C 2948/92876* (2019.02); *B29D 2030/3078* (2013.01); *B29K 2105/0023* (2013.01); *B29K 2995/0005* (2013.01); *B29L 2030/002* (2013.01)

(56) References Cited

U.S. PATENT DOCUMENTS

| | | | | |
|---|---|---|---|---|
| 8,365,568 B2* | 2/2013 | Biris | ............... | B21C 23/005 |
| | | | | 72/46 |
| 11,141,901 B2* | 10/2021 | Yuasa | ............... | B29C 64/314 |
| 2001/0045254 A1 | 11/2001 | Senbokuya et al. | | |
| 2006/0096697 A1 | 5/2006 | Miki | | |
| 2009/0320985 A1* | 12/2009 | Kudo | ............... | B29D 30/3028 |
| | | | | 152/533 |
| 2010/0101292 A1* | 4/2010 | Biris | ............... | B21C 23/005 |
| | | | | 72/46 |
| 2010/0230034 A1 | 9/2010 | Matsuoka et al. | | |
| 2013/0133811 A1 | 5/2013 | Inoue et al. | | |
| 2018/0093413 A1* | 4/2018 | Yuasa | ............... | B29C 48/05 |

FOREIGN PATENT DOCUMENTS

| | | |
|---|---|---|
| CN | 108463328 A | 8/2018 |
| DE | 197 18 699 C1 | 5/1998 |
| EP | 1738893 A1 | 1/2007 |
| EP | 2 036 696 A1 | 3/2009 |
| EP | 3263310 A1 | 1/2018 |
| JP | 2007008388 A | 1/2007 |
| JP | 2007260963 A | 10/2007 |
| JP | 2012040845 A | 3/2012 |
| WO | WO 2006/046162 | 5/2006 |
| WO | WO 2006/046259 A1 | 5/2006 |
| WO | 2008007420 A1 | 1/2008 |
| WO | 2008026275 A1 | 3/2008 |
| WO | 2018115796 A1 | 6/2018 |

OTHER PUBLICATIONS

International Search Report form the European Patent Office in corresponding International Application No. PCT/IB2020/054964 mailed Oct. 6, 2020.

Written Opinion of the International Searching Authority from the European Patent Office in corresponding International Application No. PCT/IB2020/054964 mailed Oct. 6, 2020.

Notice of Reasons for Refusal issued by the Japanese Patent Office on Mar. 26, 2024, in corresponding Japanese Application No. JP 2021-568324.

Office Action issued by the European Patent Office on Jun. 19, 2024, in corresponding European Application No. EP 20730329.8.

* cited by examiner

PROCESS FOR BUILDING TYRES FOR VEHICLE WHEELS

This Application is national stage entry under 35. U.S.C. § 371 of International Application PCT/IB2020/054964 filed on May 26, 2020, which claims priority to Italian Application No. 102019000007590 filed on May 30, 2019; the contents of each the applications is incorporated herein by reference in their entirety.

The present invention relates to a process and an apparatus for building tyres for vehicle wheels. The invention also relates to a tyre for vehicle wheels, obtainable by means of the above process and/or apparatus.

In particular, the invention may be conveniently used to improve the construction of the tread band and/or other elastomeric components used in the building of a tyre.

A tyre for vehicle wheels generally comprises a carcass structure comprising at least one carcass ply having respectively opposite end flaps engaged with respective annular anchoring structures, integrated in the areas usually identified by the name of "beads", having an inner diameter substantially corresponding to a so-called "fitting diameter" of the tyre on a respective mounting rim.

The carcass structure is associated with a belt structure which may comprise one or more belt layers, arranged in radial superposition with respect to each other and with respect to the carcass ply, having textile or metallic reinforcing cords with crossed orientation and/or substantially parallel to the circumferential development direction of the tyre (at 0 degrees). A tread band is applied in a position radially outer to the belt structure, also made of elastomeric material like other semi-finished products making up the tyre.

Respective sidewalls of elastomeric material are further applied in an axially outer position on the lateral surfaces of the carcass structure, each extending from one of the lateral edges of the tread band up at the respective annular anchoring structure to the beads. In "tubeless" tyres, an airtight coating layer, usually called "liner", covers the inner surfaces of the tyre.

After the building of the green tyre, carried out by assembling respective components, a moulding and vulcanisation treatment is generally carried out in order to determine the structural stabilisation of the tyre through cross-linking of the elastomeric compositions, as well as to impart a desired tread pattern onto the same, where required, and any distinguishing or information graphic signs at the tyre sidewalls.

The terms "radial" and "axial" and the expressions "radially inner/outer" and "axially inner/outer" are used referring to the radial direction of a tyre or of a forming drum (i.e. to a direction perpendicular to the axis of rotation of the tyre or of the forming drum) and to the direction of the axes of rotation of the tyre or of the forming drum. A radial plane of the tyre or of the forming drum contains the respective axis of rotation.

The term "elastomeric material" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating, so as to form the final manufactured article.

The term "to spiral"/"spiraling" means an operation in which at least one continuous elongated element made of elastomeric material, for example in the form of a tape, is circumferentially wound around a geometric axis, to form a plurality of coils respectively approached in the axial direction and/or superimposed in the radial direction.

The term "structural component" refers to tyre components which integrate structural reinforcement elements typically in the form of metal, textile or hybrid cords. For example, the carcass ply/plies, the belt layers, the bead cores and some fillers are structural components.

The term "elastomeric component" means a component of the tyre made of elastomeric material in the absence of cords or other structural reinforcement elements. The elastomeric material may, however, incorporate binding or reinforcing fillers, for example in the form of dispersed fibres. Elastomeric components are for example the tread band, the sidewalls, the under-layer, the liner, the under-liner, the anti-abrasive elements, the filler inserts or other components in elastomeric material of the tyre.

WO2006/046259 on behalf of the Applicant, describes a tyre for vehicle wheels in which the tread band, the sidewalls and/or other structural elements of elastomeric material have a layered structure comprising at least a first component and at least a second component of a material having a composition different from that of the first component. The first and second components have a corrugated interface profile, defining elements of mutual mechanical engagement.

WO2006/046162 on behalf of the Applicant describes the construction of a tyre for motor vehicles, in which one or more structural elements in elastomeric material, such as for example a tread band, provided with a respective substrate, are made by laying on the carcass structure or other forming support a continuous elongated element longitudinally divided into a first and a second mutually coupled portion, obtained by extrusion of two different elastomeric materials coming from respective extruders belonging to a common extrusion nozzle. The deposition of the turns takes place so that the first and second materials respectively form a first layer and a second layer superimposed on the first layer.

US2006/0096697 proposes a method for manufacturing a tyre in which the construction of the tread band provides that a cylindrical top portion is formed on a substantially cylindrical forming drum by means of a simultaneous spiraling of a continuous elongated element, made with a first non-conductive elastomeric material, and an elongated insert, made with a second electrically conductive elastomeric material, by means of respective applicators, each comprising a belt conveyor. Each belt conveyor continuously feeds the respective elongated element or insert into a predetermined winding position on the surface of the forming drum. The elongated element and insert each come continuously from a respective dispenser, in particular an extruder or a calendar, located upstream of the belt conveyor, after interposition of a festoon through which the control of the outlet speed from the dispenser is carried out. The applicator is supported by a movement unit, and is alternatively movable at least along an axial direction with respect to the forming drum.

US 2013/0133811 provides for making a tread band by the simultaneous spiraling of two continuous ribbon-like elements delivered by respective extruders directly onto the deposition surface of a forming drum actuated in rotation. One of the extruders comprises two distinct mixing units, used for processing a first non-conductive elastomeric material and a second conductive elastomeric material, respectively, which flow into the same extrusion nozzle. The mixing unit used for the processing of the second conductive elastomeric material may be selectively activated and deactivated during processing, to determine when needed the dispensing of a ribbon-like conductive insert, coupled side by side along the respective ribbon-like element coming out of the extrusion head.

In the manufacture of some elastomeric components, in fact, the coupling of two or more different elastomeric materials may be required. Typically, an elastomeric base material is provided whose composition is designed to impart certain basic properties to the respective elastomeric component, and one or more inserts made with an additional elastomeric material, whose composition is designed to impart desired additional properties to the same elastomeric component.

For example, for the construction of the tread band it is known to use an elastomeric base material containing a silica filler, to meet the need to obtain certain basic properties, for example high friction coefficient, abrasion resistance, low hysteresis etc. Since this base material is typically non-conductive, the insertion of at least one insert made of an additional electrically conductive elastomeric material is usually required, to meet the need to give the tread band the ability to discharge electrostatic charges to the ground.

The use may be required of one or more further inserts made of a third elastomeric material, different from the elastomeric base material and/or from the additional elastomeric material, for example at each of the axially opposite ends of the tread band, and/or of the radially outer apex of each sidewall, in order to promote a correct coupling between the sidewalls and the tread band, typically made with respective elastomeric materials such that the mutual coupling during the subsequent building steps may be difficult.

However, the Applicant has observed that in the building of tyres by using the spiraling of a continuous elongated element, the additional properties sought by the use of the additional inserts may for example be compromised as a result of deformations and displacements undergone by the individual turns formed by the continuous elongated element, for example under the effect of the high pressures induced to the entire structure of the tyre during the moulding and vulcanisation treatment.

The Applicant further observed that the greater the quantity of the additional elastomeric material introduced into the elastomeric component in order to impart the required additional property, the greater its negative impact on the performance of the same elastomeric component in relation to other basic properties required.

The Applicant has therefore perceived that by implementing suitable measures to optimise the quantity and distribution of the additional elastomeric material in the continuous elongated element, it is possible to obtain qualitative improvements in the product and achieve a simplification of the equipment used for the building and/or application of the continuous elongated element itself, as well as a convenient reduction of the times required for building the tyre.

In particular, the Applicant has found that by building during the extrusion a coating or covering layer extending along the continuous elongated element surrounding the profile thereof in cross section, it is possible to impart to the elastomeric component, subsequently obtained by spiraling, desired additional properties dictated by specific design needs without significantly affecting other basic properties typically required of the elastomeric component itself. Furthermore, the coating or covering layer may be made according to a suitably limited thickness, using a reduced amount of additional elastomeric material. The reduced amount of additional elastomeric material required, in addition to reducing the impact on the other basic properties of the elastomeric component obtained, allows the extrusion apparatuses to be significantly simplified and production costs to be reduced.

More in particular, in a first aspect thereof, the invention relates to a process for building tyres for vehicle wheels.

Preferably, at least one elastomeric component of a tyre is made by applying at least one continuous elongated element according to a plurality of turns around a forming drum rotating around a geometric rotation axis thereof.

Preferably, said continuous elongated element is made by the action of extruding a first material through an extrusion nozzle, to form an inner core of said continuous elongated element exiting from an outlet opening of the extrusion nozzle.

Preferably, said continuous elongated element is made by the action of, during said extrusion, conveying around the first material, at the extrusion nozzle and upstream of the outlet opening, a second material different from the first material, to form a coating layer of cladding which (entirely) surrounds the inner core.

According to another aspect thereof, the invention relates to an apparatus for building tyres for vehicle wheels.

Preferably, an extrusion assembly is provided, having an extrusion nozzle longitudinally crossed by an outlet channel leading to an outlet opening.

Preferably, a first supply unit is provided for introducing a first elastomeric material into a first supply duct which converges axially into the outlet channel of the extrusion nozzle.

Preferably, a forming drum is provided, operable in rotation in front of the outlet opening of the extrusion nozzle.

Preferably, the extrusion assembly comprises an injection chamber arranged around the outlet channel of the extrusion nozzle and flowing therein through a radial intake slit extending along a closed line around the outlet channel itself.

Preferably, the extrusion assembly comprises a second supply unit for introducing a second elastomeric material into a second supply duct leading to the injection chamber.

According to a further aspect thereof, the invention relates to a tyre for vehicle wheels.

Preferably, a carcass structure is provided, having at least one carcass ply having respective end flaps engaged in respective annular anchoring structures.

Preferably, a belt structure extending circumferentially around the carcass structure is provided.

Preferably, elastomeric components applied to the carcass structure and the belt structure are provided.

Preferably, at least one of said elastomeric components comprises a continuous elongated element wound according to concentric turns around an axis of rotation of the tyre.

Preferably, one or more of said turns have an inner core composed of a first elastomeric material and a coating layer composed of a second elastomeric material different from the first elastomeric material, which (integrally) surrounds the inner core.

The Applicant believes that the outer surfaces of the elastomeric component thus formed may exhibit the additional properties brought by the elastomeric material which constitutes the coating or covering layer of the spiral-shaped elongated element. At the same time, the elastomeric material constituting the inner core of the continuous elongated element gives the elastomeric component the required basic properties.

The Applicant considers it possible to exploit this circumstance in a particularly convenient way when the desired additional properties must be expressed in the behaviour of the elastomeric component in relation to other elements with which it must come into contact during the construction and/or use of the tyre.

For example, in a tread band it is possible to provide that at least a part of the elongated element has a high electrical conductivity as an additional property, in order to be able to discharge to the ground the electric charges accumulated by the vehicle while driving. By arranging a coating covering layer or with a minimum or adequately small thickness, it is also possible to effectively promote the dispersion of electrostatic charges without significantly affecting the basic properties, such as road grip, low hysteresis, wear resistance, etc.

Furthermore, the cross-sectional areas of the coating or covering layer and of the inner core may be easily modulated with respect to each other according to requirements, during the extrusion of the elongated element.

For example, by reducing the thickness and consequently the cross-sectional area of the coating or covering layer and/or the inner core down to a null value, gradually or almost instantaneously during the extrusion, and simultaneously integrating the reduction of the area of one with a corresponding increase in the area of the other, it is also possible to obtain a tread band or other elastomeric component of the tyre having several parts made with respectively different compounds, as well as obtaining more elastomeric components made with respectively different compounds.

In particular, it becomes possible to integrate in the axially opposite ends of the tread band portions of radially outer sidewalls having contact surfaces with the remaining portions of the sidewalls made with an elastomeric material compatible or identical to the elastomeric material typically used for building the aforesaid remaining portions of the sidewalls of the tyre, so as to facilitate a satisfactory coupling between the sidewalls and the tread band during building and the subsequent moulding and vulcanisation steps of the tyre.

In at least one convenient embodiment, the invention may further comprise one or more of the following preferential features.

Preferably, the application takes place simultaneously with the extrusion.

Preferably, said application comprises transmitting a transverse distribution movement between the forming drum and the extrusion nozzle, for distributing said turns in mutual approaching relationship.

Preferably, the action of extruding the first material in the absence of the second material is also provided.

Preferably, the action of extruding the first material in the absence of the second material precedes the action of conveying the second material.

Preferably, the action of extruding the first material in the absence of the second material is carried out after the action of conveying the second material.

Preferably, the action of interrupting the conveying of the second material is also provided, to extrude the first material in the absence of the second material.

Preferably, the action of extruding the second material in the absence of the first material is also provided.

Preferably, the action of extruding the second material in the absence of the first material precedes the action of conveying the first material.

Preferably, the action of extruding the second material in the absence of the first material is carried out after the action of conveying the first material.

Preferably, the action of interrupting the conveying of the first material is also provided, to extrude the second material in the absence of the first material.

Preferably, the action of modulating a flow rate of the second material conveyed around the inner core is provided, to modify the thickness of the coating layer applied around the inner core.

Preferably, the flow rate of the first material is modulated in conjunction with the flow rate modulation of the second material, to keep the overall flow rate of the first and second material substantially constant through the outlet opening.

Preferably, the action of increasing or decreasing a flow rate of the first material in conjunction with a decrease or respectively an increase in the flow rate of the second material is also provided.

Preferably, during said extrusion, the action of conveying a third material different from the first material and from the second material around the first material, at the extrusion nozzle and upstream of the outlet opening, is further carried out to form a coating layer which (entirely) surrounds the inner core.

Preferably, the action of conveying the third material is carried out in the absence of conveying the second material.

Preferably, the action of extruding the first material in the absence of the conveying of second and third material is also provided.

Preferably, the action of extruding the third material in the absence of the first material is also provided.

Preferably, the action of extruding the third material in the absence of the first and second material is also provided.

Preferably, the action of modulating a flow rate of the third material conveyed around the inner core is provided, to modify the thickness of the covering layer applied around the inner core. Preferably, the flow rate of the first material is modulated in conjunction with the flow rate modulation of the third material, to keep the overall flow rate of the first and third material substantially constant through the outlet opening.

Preferably, the action of increasing or decreasing a flow rate of the first material in conjunction with a decrease or respectively an increase in the flow rate of the third material is also provided. Preferably, the first supply unit comprises a first mixing group operating on the first elastomeric material and a gear pump operatively interposed between the first mixing group and said extrusion nozzle.

Preferably, the second supply unit comprises a second mixing group having a screw operable in rotation in a mixing chamber.

Preferably, said screw is axially movable in the mixing chamber, to transfer the second elastomeric material into the injection chamber.

Preferably, said first supply unit and second supply unit are operable independently of one another, to cause a selective and controlled feeding of the first material and/or second material towards the outlet channel of the extrusion nozzle.

Preferably, a third supply unit is also provided for introducing a third elastomeric material into a third supply duct leading to the injection chamber.

Preferably, the third supply unit comprises a respective mixing group having a screw operable in rotation in a mixing chamber and axially movable in the mixing chamber for transferring the third elastomeric material into the injection chamber.

Preferably, said first supply duct ends in a distributor associated with said extrusion nozzle, said distributor having a conical ring shape having an inner channel for the passage of said first elastomeric material.

Preferably, said radial slit has a variable axial dimension along a peripheral extension thereof.

Preferably, the elastomeric component formed by said continuous elongated element is a tread band.

Preferably, the second elastomeric material is electrically conductive.

Preferably, the second elastomeric material has the same composition as the elastomeric material used for the manufacture of tyre sidewalls.

Preferably, in one or more of said turns the coating layer has a different thickness than the thickness of the coating layer present in other turns.

Preferably, turns with coating layers having respectively different thicknesses have respectively equal cross-sectional dimensions. Preferably, a plurality of said turns are devoid of the coating layer.

Preferably, turns without the coating layer and turns provided with the coating layer have respectively equal cross-sectional dimensions.

Preferably, one or more of said turns have a covering layer which (entirely) surrounds the inner core, said covering layer being composed of a third elastomeric material different from the first elastomeric material.

Preferably said third elastomeric material is different from the second elastomeric material.

Preferably, the third elastomeric material has the same composition as the elastomeric material used for the manufacture of tyre sidewalls.

Further features and advantages will become apparent from the detailed description of a preferred but not exclusive embodiment of a process and an apparatus for manufacturing tyres for vehicle wheels, and of a tyre for vehicle wheels obtainable by means of the aforementioned method and/or apparatus, according to the present invention. Such description is given hereinafter with reference to the accompanying drawings, provided only for illustrative and, therefore, non-limiting purposes, in which.

With reference to the above figures, reference numeral 1 indicates an apparatus for building tyres for vehicle wheels, according to the present invention.

The apparatus 1 may be conveniently used for building tyres 2 (FIG. 7) essentially comprising a carcass structure 3 having at least one carcass ply 4. An airtight layer of elastomeric material or so-called liner 5 may be applied internally to the carcass ply/plies 4. Two annular anchoring structures 6 comprising each a so-called bead core 6a bearing an elastomeric filler 6b in radially outer position are engaged to respective end flaps 4a of the carcass ply or plies 4. The annular anchoring structures 6 are integrated in the proximity of zones usually identified by the name of "beads" 7, at which the engagement between tyre 2 and a respective mounting rim usually occurs.

Figure 7:
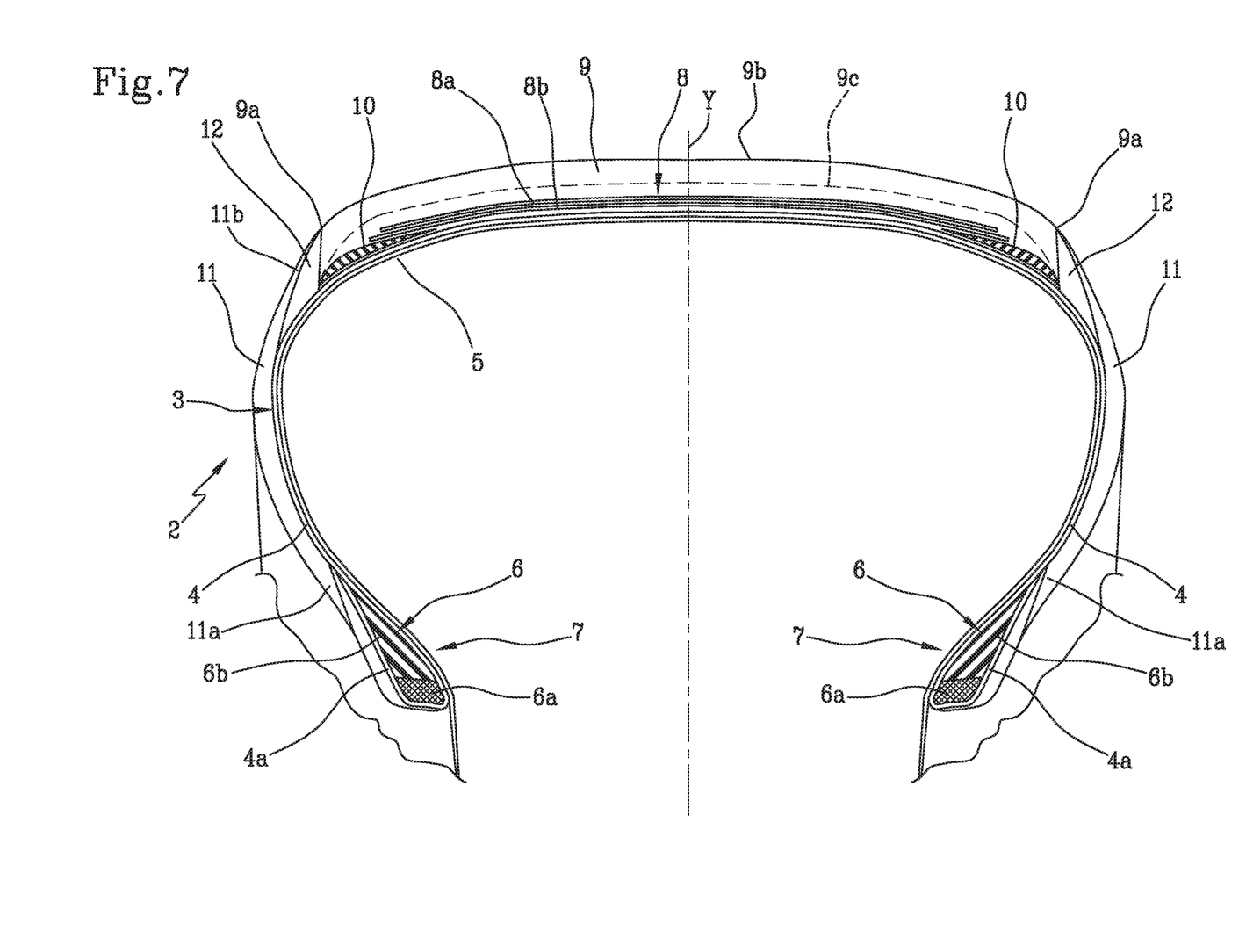
FIG. 7 schematically shows a radial section of a tyre for vehicle wheels, according to the present invention.

A belt structure 8, comprising one or more belt layers 8a, 8b, extends circumferentially around the carcass structure 3, and a tread band 9 is circumferentially superimposed on the belt structure 8.

The belt structure 8 may be associated with so-called "under-belt inserts" 10 placed each between the carcass ply/plies 4 and one of the axially opposite end edges of the belt structure 8.

Two sidewalls 11 are applied in laterally opposite positions on the carcass ply/plies 4. Each side has a radially inner apex 11a joined to the corresponding bead 7 and a radially outer end portion 11b possibly joined to a radially outer apex 12 carried by the tread band 9 at an axially outer end 9a thereof.

With reference to the definitions illustrated above, in the example of tyre shown, the carcass ply/plies 4, the belt layers 8a, 8b, and the bead cores 6a, represent structural components, while the sidewalls 11, the liner 5, the fillers 6a, the under-belt inserts 10 and the tread band 9 with any radially outer apices 12 represent elastomeric components, applied to the carcass structure 3 and/or to the belt structure 8.

In a preferred embodiment example described herein, the apparatus 1 is used to make the tread band 9. However, the present invention may be conveniently used for spiraling any other elastomeric component, for example sidewalls 11, liners 5, fillers 6a, under-belt inserts 10 and/or other elastomeric components required for building the tyre 2.

Figure 1:
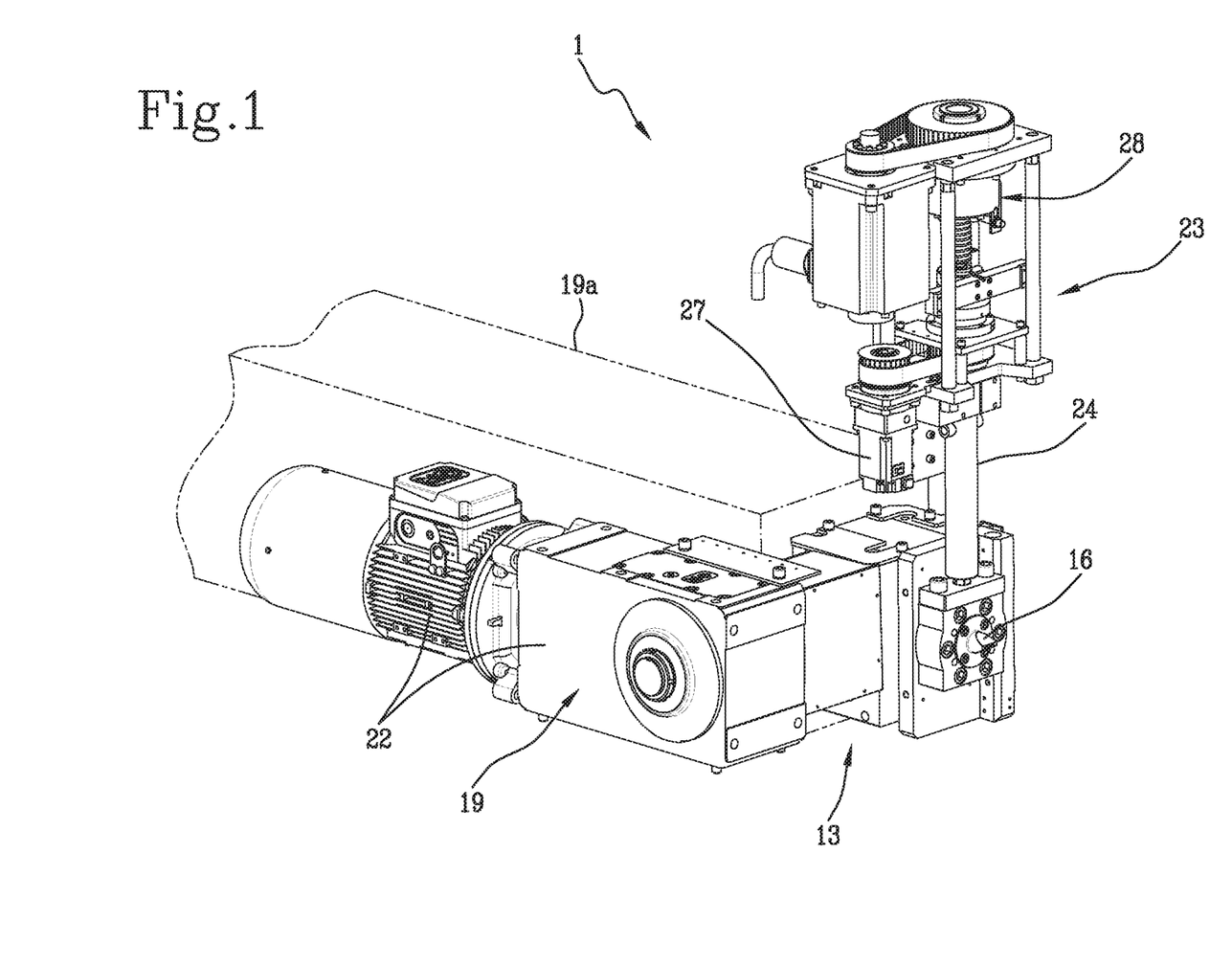
FIG. 1 shows a perspective view of an apparatus for building tyres for vehicle wheels, according to the present invention.
Figure 2:
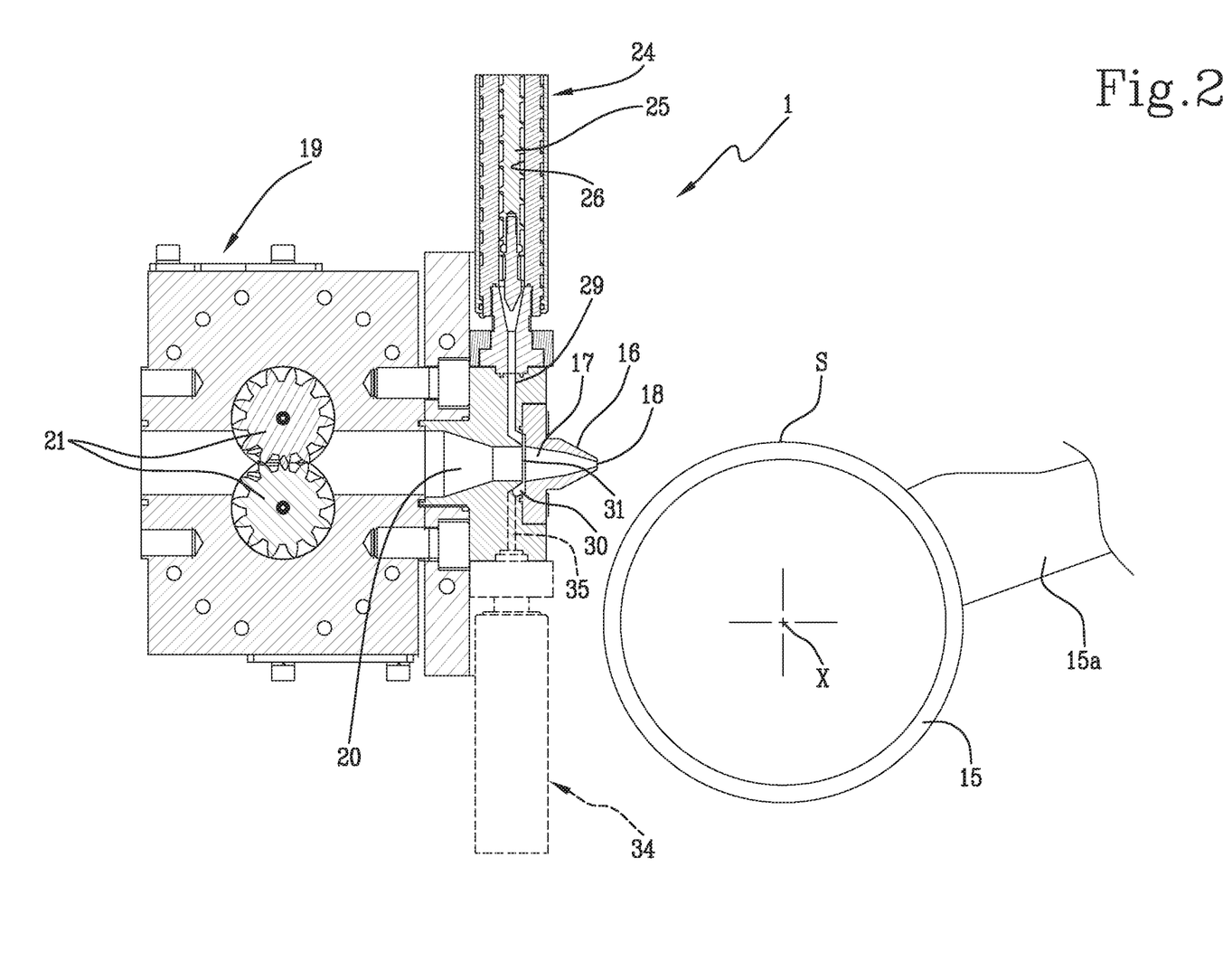
FIG. 2 shows the apparatus of FIG. 1 in longitudinal section.

The apparatus 1 comprises an extrusion assembly 13 arranged to dispense at least one continuous elongated element 14, preferably in the vicinity of an outer surface S of a forming drum 15. The forming drum 15 is adequately supported in the vicinity of the extrusion apparatus, for example by means of a robotic arm 15a. The robotic arm 15a appropriately supports and moves the forming drum 15 so as to determine the application of the continuous elongated element 14 according to a plurality of turns around the outer surface S of the forming drum 15 itself, while the latter rotates around a geometric axis of rotation X thereof. The extrusion assembly 13 has at least one extrusion nozzle 16 longitudinally crossed by an outlet channel 17 leading to an outlet opening 18, through which the continuous elongated element 14 is dispensed.

Upstream of the extrusion nozzle 16, a first supply unit 19 is arranged, configured for introducing a first elastomeric material into a first supply duct 20 which converges axially into the outlet channel 17 of the extrusion nozzle 16.

Preferably, the first supply unit 19 comprises a first mixing group 19a, only schematically indicated in that it may be constructed in a known manner, operating on the first elastomeric material. A gear pump 21 is operatively interposed along the first supply duct 20, between the first mixing group 19a and the extrusion nozzle 16. The use of the gear pump 21, the actuation speed whereof may be suitably adjusted by means of a programmable logic controller (PLC) associated with an actuator unit 22, allows controlling with suitable accuracy, instant by instant, the flow rate of the first elastomeric material sent to the extrusion nozzle 16.

The extrusion assembly 13 further comprises a second supply unit 23 configured to introduce a second elastomeric material different from the first elastomeric material into the outlet channel 17 of the extrusion nozzle 16.

More particularly, the second supply unit 23 preferably comprises a second mixing group 24 having a screw 25 operatively housed in a mixing chamber 26, and operable in rotation by means of a motor 27. Preferably, the screw 25 is also axially movable in the mixing chamber 26, for example on the command of an axial movement unit 28, to facilitate the transfer of the second elastomeric material into a second supply duct 29, extending in a radial direction with respect to the outlet channel 17 and leading to an injection chamber 30. The injection chamber 30, preferably having an annular configuration, is arranged around the outlet channel 17 of the extrusion nozzle 16 and flows therein through a radial intake slit 31, which extends along a closed line around the outlet channel 17 itself, entirely surrounding it (FIG. 2).

Figure 3:
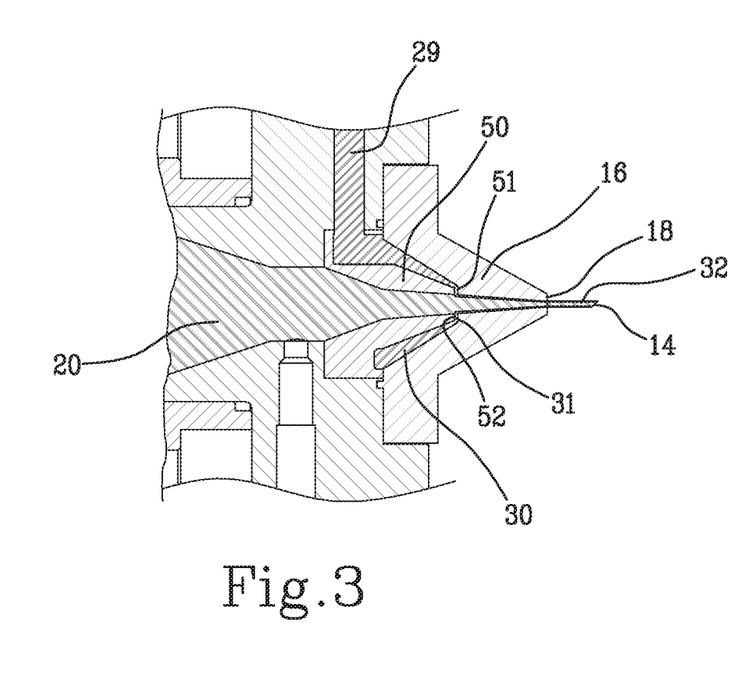
FIG. 3 shows an enlarged detail of FIG. 2, highlighting a variant embodiment.
Figure 4:
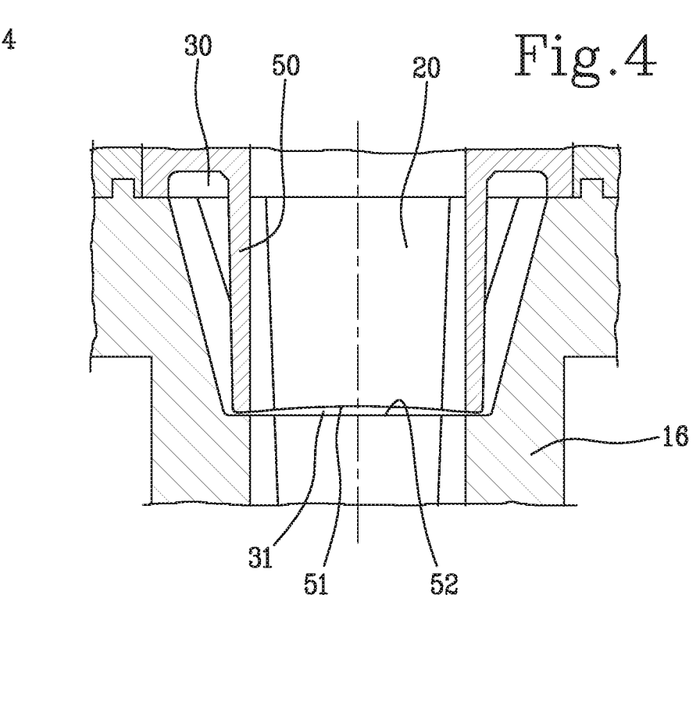
FIG. 4 shows a detail of the embodiment variant of FIG. 3 sectioned longitudinally according to an orthogonal plane with respect to FIG. 3.
Figure 5:
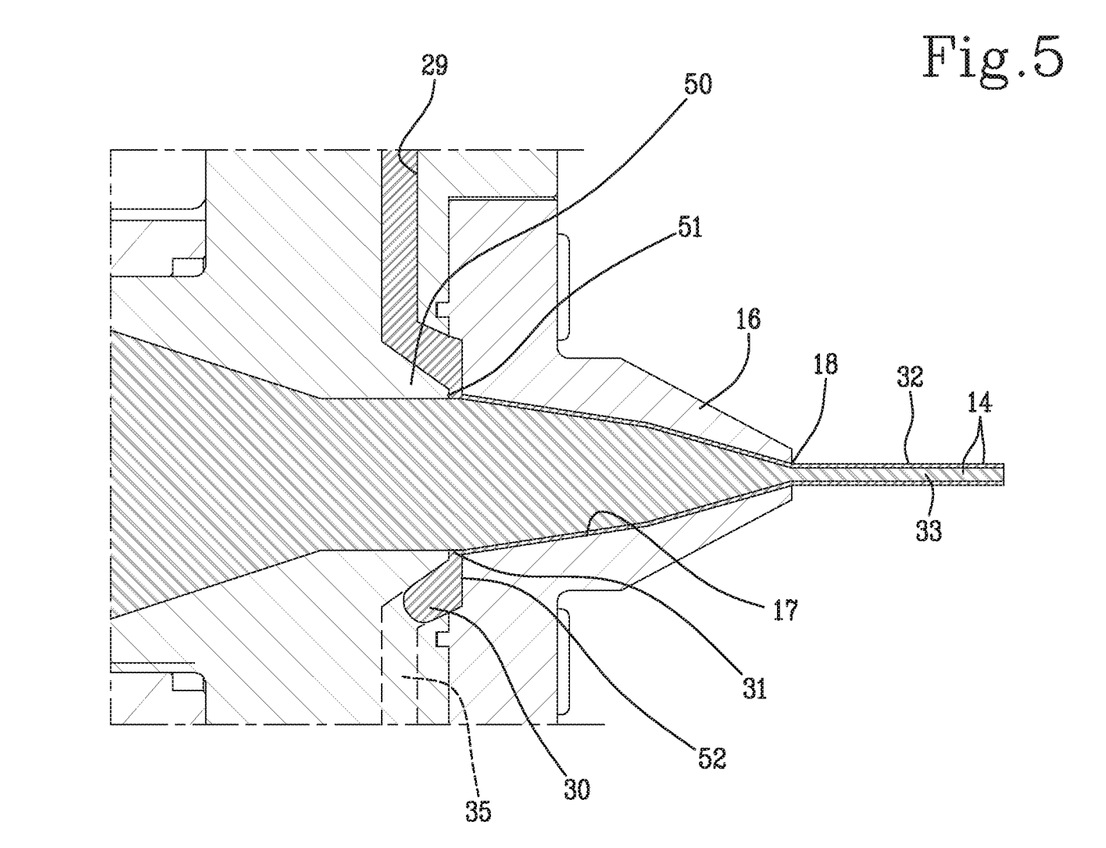
FIG. 5 shows on an enlarged scale a detail of FIG. 2, highlighting a continuous elongated element dispensed by the extrusion nozzle.

The supply duct 20 may end with a distributor 50 associated with the extrusion nozzle 16. The distributor 50 has a conical ring shape having an inner channel for the passage of the above first elastomeric material ending with an outlet section 51. The outlet section 51 is slightly spaced from an inlet section 52 of the extrusion nozzle 16. The radial slit 31 is axially delimited between the outlet section 51 of the distributor 50 and the inlet section 52 of the extrusion nozzle 16. The outlet section 51 may have a substantially elliptical, or in any case geometrically similar, albeit possibly larger, peripheral profile with respect to that of the outlet opening 18 and therefore of the continuous elongated element 14 coming out of it. As exemplified in the embodiment variant shown in FIGS. 3 and 4, the outlet section 51 of the distributor 50, and/or the inlet section 52 of the extrusion nozzle may have, in a plane orthogonal to the longitudinal axis thereof coinciding with that of the channel 20 and of the extrusion nozzle 16, a concave profile or in a different way, such as not to be flat. As a result of such a non-planar profile, a variable distance is created between the distributor 50 and the extrusion nozzle 16 along the peripheral extension of the outlet section 51 and the inlet section 52. In other words, the radial slit 31 may have a variable axial dimension along the peripheral extension thereof. During the operation of the apparatus 1, the first supply unit 19 and the second supply unit 23 are adapted to be operated independently of one another, to cause the selective and controlled feeding of the first material and/or second material towards the outlet channel 17 of the extrusion nozzle 16.

The use of the first material provides that while the forming drum 15 is rotated and suitably moved in front of the outlet opening 18, the first supply unit 19 is activated to feed the first material into the outlet channel 17 of the extrusion nozzle 16. The first material is therefore extruded through the extrusion nozzle 16, coming out of the outlet opening 18 in the absence of the second material, to be simultaneously applied around the outer surface S of the forming drum 15. The rotation imparted to the forming drum 15 around its geometric axis of rotation X determines the formation of consecutive turns C, while a transverse movement imposed by the robotic arm 15a to the forming drum 15 determines the distribution of the turns C according to a predefined scheme, for example in mutual approaching relationship along the axial extension of the outer surface S of the forming drum 15.

At any desired moment during the extrusion, the second supply unit 23 lends itself to being activated, for example by axial movement of the respective screw 25, for pushing the second material into the injection chamber 30. At the extrusion nozzle 16 and upstream of the outlet opening 18, the second material pushed into the injection chamber 30 is conveyed through the radial slit 31, around the first material coming from the first supply duct 20, preferably through said distributor 50. The second material is therefore distributed around the first material which is about to be extruded through the extrusion nozzle 16. The second material consequently forms, externally to the continuous elongated element 14 dispensed by the outlet opening 18, said coating layer 32 which entirely surrounds an inner core 33, defined by the first material. By using the aforementioned concave or non-planar shape of the outlet section 51 of the distributor 50 and/or of the inlet section 52 of the extrusion nozzle 16 it is possible to initially create a variable layer thickness, i.e. in the vicinity of the radial slit 31 of the coating layer 32 which subsequently, due to the transverse displacements undergone by the second elastomeric material (and/or by a third elastomeric material as will be seen below) due to the change of section in the path along the extrusion nozzle 16, becomes substantially constant in proximity of the above outlet opening 18. The dispensing of the second material for the purpose of making the coating layer 32 may be maintained for a time necessary to form a desired number of turns C around the forming drum 15. The second supply unit 23 may be subsequently deactivated, so as to interrupt the conveying of the second material and continue the construction of other parts of the elastomeric component to be built with the dispensing of the first material in the absence of the second material.

In addition or alternatively, where required, deactivation of the first supply unit 19 may be provided, to extrude the second material in the absence of the first material. This technical measure may be used, for example, to obtain turns C made exclusively with the second material at with certain areas of the elastomeric component to be built, or to make portions of the above elastomeric component with the use of only the second material.

Depending on the requirements, the action of extruding the first or second material in the absence of the other material may precede or follow the action of extruding the same other material.

The action of modulating the flow rate of the second material conveyed around the inner core 33 may be advantageously provided, for example by adjusting the axial movement speed of the screw 25, to modify the thickness of the coating layer 32 applied around the inner core itself.

By adjusting the actuation speed of the gear pump 21, also the flow rate of the first material may be advantageously modulated, possibly in conjunction with the variation of the flow rate of the second material. More specifically, it is possible to increase or decrease the flow rate of the first material in conjunction with a decrease or, respectively, an increase in the flow rate of the second material. For example, an increase in the flow rate of the second material may correspond to an equal decrease in the flow rate of the first material, so as to keep the overall flow rate, i.e. the sum of the flow rates, of the first and second material through the outlet opening 18, and therefore the dimensions of the continuous elongated element 14 in cross section, substantially constant.

Flow modulation may also be used to gradually change from a condition in which only one material is extruded in the absence of the other, to an operating condition in which only the other material is extruded.

According to a possible preferential variant, the apparatus 1 may further comprise a third supply unit 34 configured to introduce a third material, different from the first material and, preferably but not necessarily also from the second material, into a third supply duct 35 leading to the injection chamber 30.

The third supply unit 34, shown schematically in dashed lines in FIG. 2, may be made substantially identical to the second supply unit 23.

The third supply unit 34 may be activated selectively and independently of the activation of the first supply unit 19 and the second supply unit 23. Preferably, the activation of the third supply unit 34 is carried out when at least the second supply unit 23 remains inactive.

The activation of the third supply unit 34 during the extrusion of the first material causes the third material to be conveyed to the injection chamber 30, preferably in the absence of the second material being conveyed, to form a covering layer 36 which entirely surrounds the inner core 33 formed by the first material itself.

The action of modulating the flow rate of the third material conveyed around the inner core 33 may be advantageously provided, by operating on the third supply unit 34 in a similar way to that said with reference to the second supply unit 23, to modify the thickness of the covering layer 36 formed by the third material.

It is also possible to carry out the action of extruding the first material in the absence of conveying the second and/or third material, as well as extruding the second/third material in the absence of the first and/or third/second material.

The flow rate of the first material may be modulated in conjunction with the flow rate modulation of the third material, by increasing or reducing a flow rate of the first material in conjunction with a decrease or, respectively, an increase in the flow rate of the third material. For example, an increase in the flow rate of the third material may correspond to an equal decrease in the flow rate of the first material, so as to keep the overall flow rate, i.e. the sum of the flow rates, of the first and third material through the outlet opening 18, and therefore the dimensions of the continuous elongated element 14 in cross section, substantially constant.

In a preferred embodiment which provides the second material equal to the third material, it becomes possible if required to create the continuous coating layer around the inner core 33 for a number of turns as high as desired, and also for the entire spiraling step of the continuous elongated element 14, alternating the operation of the second supply unit 23 and of the third supply unit 34, where one is placed in the operating (injection) step while the other is in the material loading step.

In a further preferred embodiment (not illustrated), providing a separate injection chamber for the second supply unit 23 and for the third supply unit 34 respectively, in which each separate injection chamber is axially distant from the other along the longitudinal development of the outlet channel 17, it is possible to operate the second supply unit 23 and the third supply unit 34 simultaneously, making two coating layers with the second material and the third material respectively around the inner core 33 defined by the first material, providing the elastomeric component of the tyre formed with the continuous elongated element 14 with particular physical features.

Figure 6:
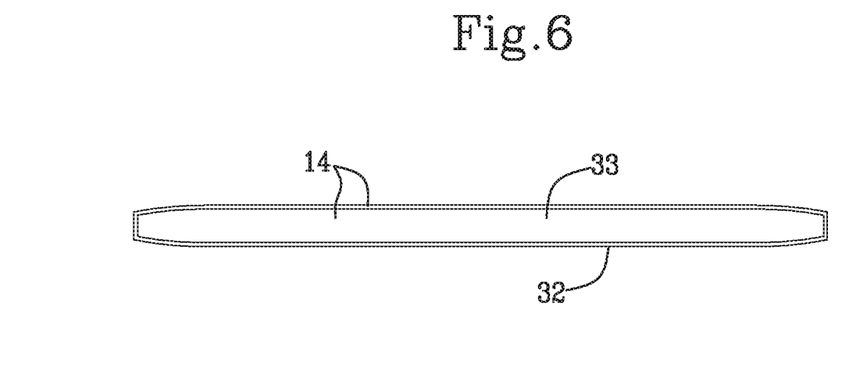
FIG. 6 is an enlarged cross section of the elongated element.

The construction of the tread band 9 or other elastomeric component may require the use of only the first material, normally for a prevailing part of the elastomeric component itself. However, in some portions of the elastomeric component, for example in an axially central portion A (FIG. 6) adjacent to the axial centre line Y of the tread band 9, the use of the second material may be required, for example to determine a desired electrical conductivity between the belt structure 8 and the radially outer surface 9b of the same tread band 9, intended for contact with the ground during use of the tyre 2.

A preferential use of the third supply unit 34 during the construction of a tread band 9 may be aimed at the realization of said radially outer apices 12. In this regard, the third supply unit 34 is suitable for being activated during the deposition of the turns C at axially outer portions B (FIG. 6) close to each of the respectively opposite axial ends 9a of the tread band 9. The continuous elongated element 14 dispensed in these circumstances will be provided with the covering layer 36 composed of the third material.

The thickness of the covering layer 36 and the overall cross-sectional dimension of the continuous elongated element 14 may be modified during the deposition, for example by progressively reducing the dimensions of the inner core 33 formed by only the first material during the deposition of the turns C increasingly closer to the axial ends 9a of the tread band 9, possibly until the dispensing of the first material is completely interrupted, so that the turns C closest to the axial ends 9a are exclusively composed of the third material.

In the tyre 2 obtained according to the present invention, at least one of the elastomeric components, in the case described the tread band 9, will be formed by the continuous elongated element 14 wound according to concentric turns C around the geometric axis of rotation X of the tyre itself.

In one or more of the turns C, the inner core 33 composed of the first elastomeric material, completely surrounded by the coating layer 32 composed of the second elastomeric material, or by the covering layer 36 composed of the third elastomeric material will be identifiable.

For the purposes of making the tread band 9, the first elastomeric material may for example comprise a relatively high quantity of silica, for example greater than 30 parts by weight out of 100 parts by weight of compound.

For the purposes of making the tread band 9, the second elastomeric material may for example contain an adequate quantity of carbon black, for example greater than 50 parts by weight out of 100 parts by weight of compound, to obtain an adequate electrical conductivity.

For the purposes of making said radially outer apices 12, the third elastomeric material will have composition and physico-chemical properties substantially identical to those of the elastomeric material used in the construction of the sidewalls 11, for an optimal coupling between the radially outer apices 12 of the sidewalls 11 and the axial ends 9a of the tread band 9 during the building of the tyre 2.

By way of example, turns C near the axial centre line Y of the tread band 9 may be covered by the coating layer 32 formed by the second electrically conductive material, turns C placed at the axial ends 9a of the tread band 9 to form the radially outer apices 12 may in turn be covered by the covering layer 36 composed of the third material, substantially identical to that of the sidewalls 11, and finally a plurality of turns C, distributed between the radially outer apices 12 and the areas close to the axial centre line Y of the tread band 9, may be formed by only the first material and without the coating layer 32 and/or the covering layer 36.

In one or more of the turns C, the coating layer 32 or the covering layer 36 may have a different thickness than the thickness of the coating layer 32 or the covering layer 36 present in other turns C.

The turns C having a coating layer 32 or a covering layer 36 having a respectively different thickness, may have cross-sectional dimensions equal to each other and/or with respect to the turns C without a coating layer 32 or a covering layer 36.

Since it completely surrounds the inner core 33, the coating layer 32 created with the second material may advantageously be made with thin thickness, without for example risking to interrupt the electrical continuity through the tread band 9 also following any deformations suffered by the turns C during vulcanisation or other processing steps after building.

The same applies to the covering layer 36 formed by the third material, which may ensure effective covering of the inner core 33 also following any deformations or crushing imposed on the individual turns C.

Figure 8:
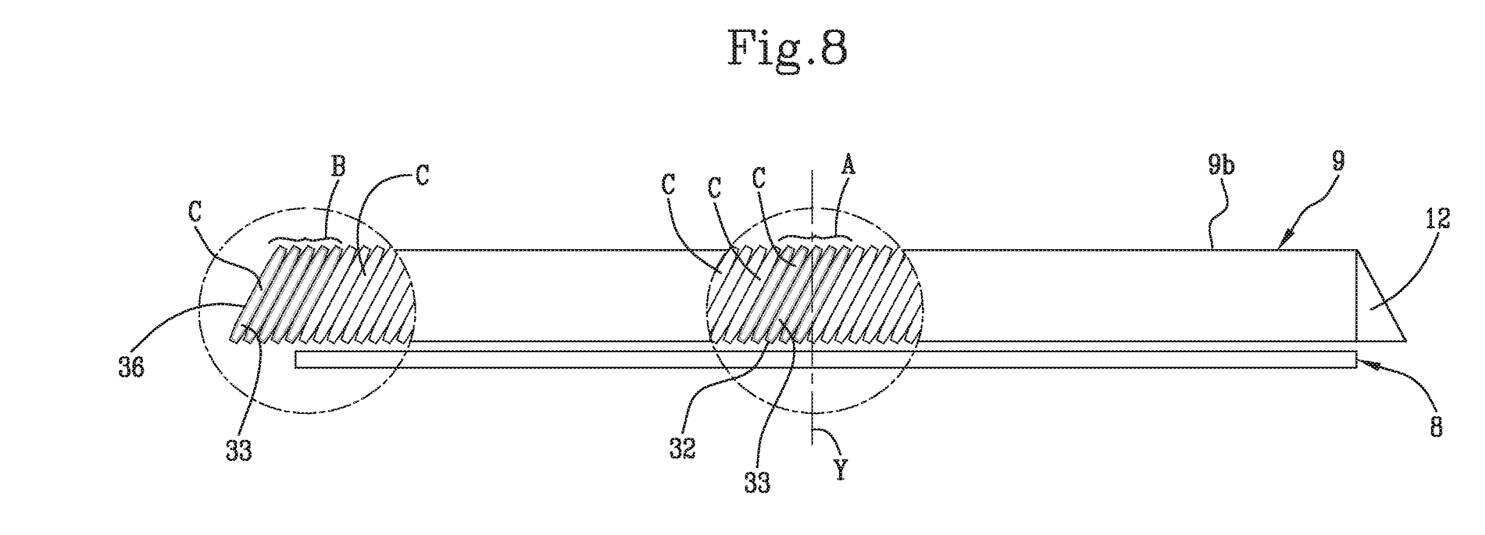
FIG. 8 schematically shows a tread band of the tyre of FIG. 7.

The pattern of deposition of the turns C of the continuous longitudinal element 14 may not be made as shown in FIG. 8 and not necessarily, for example in the building of a tread band 9, for the single turn C to simultaneously have a radially outer part exposed to the radially outer surface of the tread and a radially inner part in contact with a structural component (for example belt strip 8a, 8b) in conductive material.

Frequently the single turn C may be positioned over other turns C so that, for example in the building of the tread band 9, the coating layer 32 completely covering the outer surface of each single turn C allows contact and electrical conductivity between the turn C positioned in contact with the structural component (belt strip 8a, 8b) in conductive material with that positioned radially outer thereto, and so on up to the radially outer surface of the tread, promoting maximum flexibility of the building operations, not forced to respect particular schemes to favour, for example, electrical conductivity.

The use of the second material and/or third material in less quantity allows the impact thereof on the basic performance features required of the elastomeric component to be reduced. Furthermore, the reduced quantity of the second material allows an advantageous containment of the dimensions and costs of the second supply unit 23 and of the apparatus as a whole.

The need for a continuous supply of the second and/or third material to the second supply unit 23 for operating purpose is also eliminated. In fact, the periods of inactivity of the second supply unit 23 and/or of the third supply unit 34 may be exploited to restore the supply of second and/or third material inside the mixing chamber 26, without having to interrupt the building.

The invention claimed is:

1. A method for building tyres for vehicle wheels, wherein at least one elastomeric component of a tyre is made by applying at least one continuous elongated element according to a plurality of turns (C) around a forming drum rotating around a geometric rotation axis thereof;
   wherein a method of making the continuous elongated element comprises:
   extruding a first material, when a supply of the first material is activated, through an extrusion nozzle, to form an inner core of the continuous elongated element exiting from an outlet opening of the extrusion nozzle; and
   during the extrusion, activating a supply of a second material different from the first material, for conveying the second material around the first material, at the extrusion nozzle and upstream of the outlet opening, to form a coating layer, wherein the coating layer surrounds the inner core;
   wherein the second material is introduced into a second supply duct leading to an injection chamber arranged around a first supply duct axially converging into an outlet channel, the outlet channel longitudinally crossing the extrusion nozzle and leading to the outlet opening, the injection chamber flowing into the outlet channel through a radial intake slit extending along a closed line around the outlet channel, and
   wherein the radial intake slit has a variable axial dimension along a peripheral development thereof.

2. The method of claim 1, wherein during the extrusion of the first material, the supply of the second material is maintained for a time and then deactivated to continue extrusion of the first material in absence of the second material.

3. The method of claim 1, wherein during the extrusion of the second material, the supply of the first material is maintained for a time and then deactivated for extruding the second material in absence of the first material.

4. The method of claim 1, wherein an inlet section of the extrusion nozzle includes a non-planar profile in a plane orthogonal to the longitudinal axis of the extrusion nozzle.

5. The method of claim 1, further comprising modulating a flow rate of the second material conveyed around the inner core to modify the thickness of the covering layer applied around the inner core.

6. The method of claim 5, wherein the flow rate of the first material is modulated in conjunction with the flow rate modulation of the second material, to keep the overall flow rate of the first and second material substantially constant through the outlet opening.

7. The method of claim 1, wherein during extruding, activating a supply of a third material different from the first material and from the second material, for conveying the third material around the first material, at the extrusion nozzle and upstream of the outlet opening, to form a covering layer surrounding the inner core.

8. The method of claim 7, wherein during extruding, the supply of the second material is maintained for a time and then deactivated, for extruding the third material in absence of the second material.

9. The method of claim 7, further comprising modulating a flow rate of the third material conveyed around the inner core to modify the thickness of the covering layer applied around the inner core.

10. The method of claim 9, wherein the flow rate of the first material is modulated in conjunction with the flow rate modulation of the third material, to keep the overall flow rate of the first and third material substantially constant through the outlet opening.

* * * * *